(12) United States Patent
Bell et al.

(10) Patent No.: US 6,443,381 B2
(45) Date of Patent: *Sep. 3, 2002

(54) SEAT BELT RETRACTOR

(75) Inventors: John Bell, Carlisle (GB); Graham Jack, Eastriggs (GB); Howard Foster, Carlisle (GB); Matthew Barber, Carlisle (GB); Brian Jack, Eastriggs (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/737,242

(22) Filed: Dec. 14, 2000

(30) Foreign Application Priority Data

Jan. 27, 2000 (GB) .............................................. 0001909

(51) Int. Cl.$^7$ .............................................. B60R 22/28
(52) U.S. Cl. .................................... 242/379.1; 280/805
(58) Field of Search ...................... 242/379.1; 280/805; 297/472

(56) References Cited

U.S. PATENT DOCUMENTS

| | | | |
|---|---|---|---|
| 3,941,330 A | 3/1976 | Ulrich | 242/107.4 |
| 5,779,177 A | 7/1998 | Kielwein | 242/382.6 |

FOREIGN PATENT DOCUMENTS

| | | |
|---|---|---|
| DE | 19648472 | 7/1998 |
| DE | 29912154 | 12/1999 |
| EP | 0048809 | 4/1982 |
| EP | 0112033 B1 | 11/1986 |
| GB | 2312148 | 10/1997 |
| GB | 2323265 | 9/1998 |
| GB | 2329159 | 3/1999 |
| WO | 9619364 | 6/1996 |

*Primary Examiner*—John Q. Nguyen
(74) *Attorney, Agent, or Firm*—Lonnie Drayer; Jarett Rieger

(57) ABSTRACT

A seat belt retractor has a rotatable spool mounted in a frame, a primary locking mechanism for arresting rotation of the spool and a load absorbing mechanism arranged to come into effect at a predetermined load for absorbing a portion of the spool locking load. The load absorbing mechanism may be a section of an inwardly facing peripheral edge of the frame having a serrated or roughened texture and which is positioned and adapted so that above a predetermined load it co-operates with a smooth surfaced spool bearing face to absorb some of the load. Spool rotation is prevented on engagement of the primary locking mechanism and the load on the primary mechanism rises causing the frame side walls to deform and the serrated or roughened section is pushed closer to, and eventually against the spool bearing face, roughening the smooth surface and increasing its coefficient of friction to absorb some of the load and resist rotation of the spool.

9 Claims, 2 Drawing Sheets

SEAT BELT RETRACTOR

FIELD OF THE INVENTION

The present invention relates to a seat belt retractor and particularly to a locking mechanism for a seat belt retractor.

BACKGROUND OF THE INVENTION

A seat belt retractor typically comprises a spool on which seat belt webbing is wound and which is mounted in a frame to rotate about its longitudinal axis to pay out or wind in webbing as required by movement of the vehicle occupant. In the event of a crash the spool is locked against rotation and thus payout is prevented and the vehicle occupant is securely restrained against forward motion.

The spool is usually locked by engagement of ratchet teeth at its ends with at least one toothed pawl mounted in a load-bearing manner to the frame (e.g., on a lockbar extending across the width of the spool).

The locking pawl is under considerable strain during a crash and must be constructed to be very strong. It is not unusual for the teeth on the locking pawl to shear under particularly high crash forces.

SUMMARY OF THE INVENTION

According to the present invention there is provided a seat belt retractor comprising a rotatable spool mounted in a frame, a primary locking mechanism for arresting rotation of the spool and a load absorbing mechanism arranged to come into effect at a predetermined load for absorbing a portion of the spool locking load.

According to a preferred embodiment of the invention, the load absorbing mechanism comprises a section of an inwardly facing peripheral edge of the frame having a serrated or roughened texture and which is positioned and adapted so that above the predetermined load it co-operates with a smooth surfaced spool bearing face to absorb some of the load.

Spool rotation is prevented on engagement of the primary locking mechanism and the load on the primary mechanism rises causing the frame side walls to deform and the serrated or roughened section is pushed closer to, and eventually against the spool bearing face, roughening the smooth surface and increasing its coefficient of. friction to absorb some of the load and resist rotation of the spool.

The load absorbing mechanism does not effect locking of the seat belt retractor but instead effectively shares the load which would otherwise be placed on the locking pawl and the spool and may be used to spread the load around at least part of the periphery of the frame aperture.

In consequence, the seat belt retractor can take greater loads than was hitherto possible and/or can make use of lighter and less costly materials.

In some known seat belt retractors, a secondary locking arrangement is used to lock the spool with the frame by means of complementary locking formations, (e.g., inter-engaging teeth). This arrangement has disadvantages because the loads are very high and the teeth can shear if the locking is not suitably phased. No such phasing is necessary for the arrangement of the present invention.

DETAILED DESCRIPTION OF THE INVENTION

Figure 1:
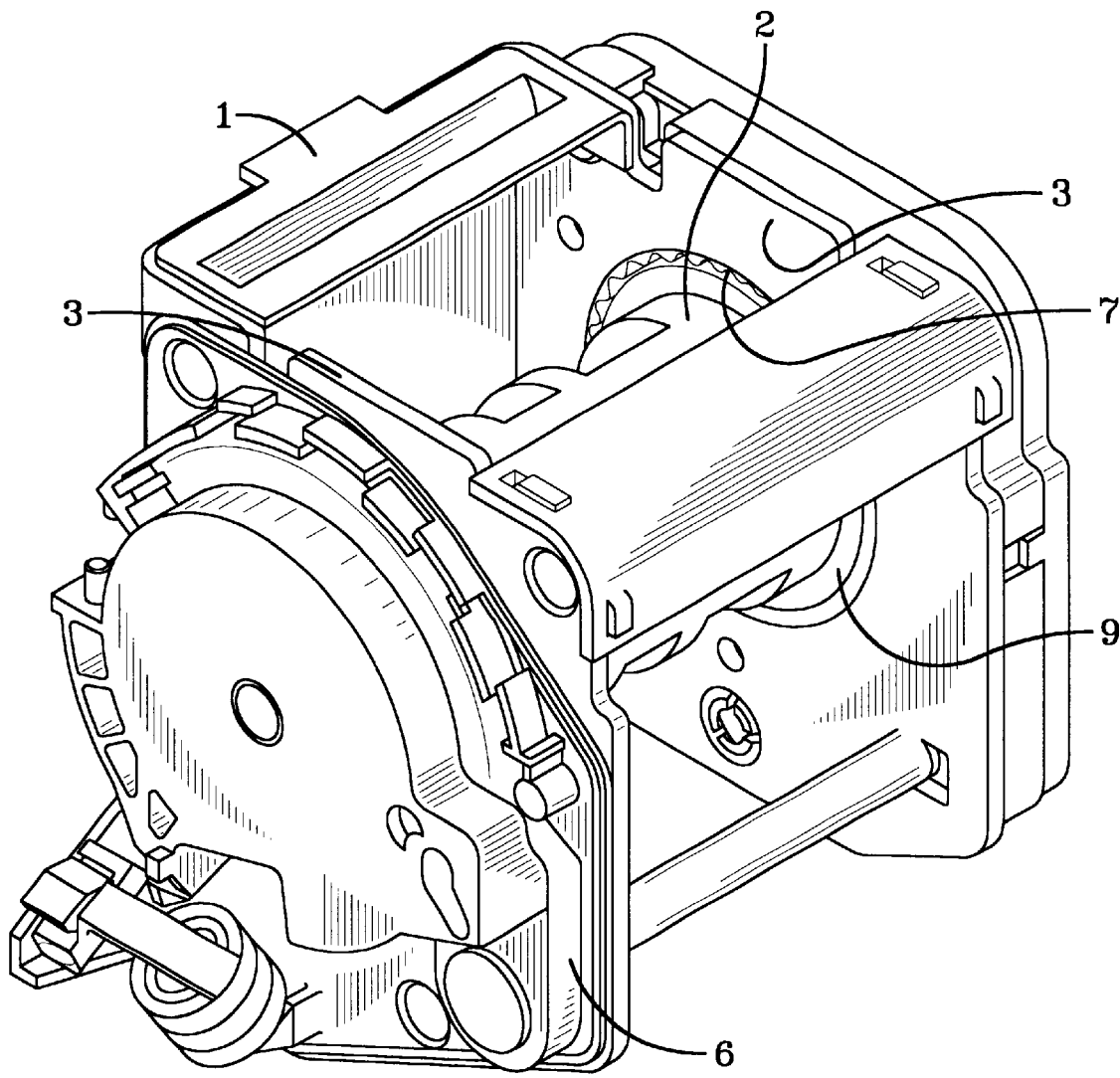
FIG. 1 is an isometric view of a seat belt retractor according to a first embodiment of the invention.

In the drawings like parts are referenced accordingly. A seat belt retractor is shown comprising a U-shaped frame 1 with a spool 2 mounted for rotation between sidewalls 3 of the frame. At least one end of the spool 2 is a toothed ratchet wheel 4 as is well known in the art and more clearly shown in FIGS. 2 and 3. A toothed pawl 6 is mounted to pivot about a pivot point 5 in the event of a crash to engage the teeth on the pawl 6 with the teeth on the ratchet wheel 4 to lock the spool against further rotation and thus against payout of seat belt webbing to restrain a vehicle occupant.

According to a preferred embodiment of the invention, the load absorbing mechanism comprises a section of an inwardly facing peripheral edge of the frame having a serrated or roughened texture and which is positioned and adapted so that above the predetermined load it co-operates with a smooth surfaced spool bearing face to absorb some of the load. A load absorbing mechanism is shown comprising serrations 7 formed on on section of the inner peripheral edge of a cutout in at least one of the sidewalls 3 of the frame 1. Preferably at least the serrated or roughened section of the frame is of a stronger material than the spool. The serrations 7 are in the plane of a smooth bearing face 9 at one end of the spool 2. A bearing face 9 may be provided at each end of the spool if serrations are incorporated into both sidewalls of the frame 1. In embodiments with the load absorbing mechanism at the same end of the spool as on the ratchet wheel 4, the bearing face 9 is axially adjacent the teeth on the ratchet wheel or wheels. The roughened or serrated section is preferably arranged diametrically opposite the pivot point of the primary locking pawl. The serrations may be in the form of rough irregularly shaped small teeth placed at irregular or random intervals or in the form of grooves in the peripheral surface. In this way the loads may be transferred from the relatively weak spool to the stronger frame and thus the primary locking pawl does not need to be so strong and can, for example be made of a weaker, less costly, material such as aluminum.

Spool rotation is prevented on engagement of the primary locking mechanism and the load on the primary mechanism rises causing the frame side walls to deform and the serrated or roughened section is pushed closer to, and eventually against the spool bearing face, roughening the smooth surface and increasing its coefficient of friction to absorb some of the load and resist rotation of the spool.

The primary locking mechanism may comprise a locking pawl 6 for engaging with ratchet teeth on the outer periphery of the spool. This is activated by the vehicle sensor in a traditional seat belt retractor. In operation, after a crash is detected the primary locking pawl 6 pivots and engages the ratchet wheel 4 to lock the spool 2 against rotation. As the crash force increases, the spool 2 moves so that one or both ends makes contact with the frame 1. The bearing face 9 is forced against the serrations 7 which etch into the face and thus increase the coefficient of the friction of the bearing face thus increasing friction between the bearing face and the frame 1 and consequently absorbing some of the load.

Figure 2:
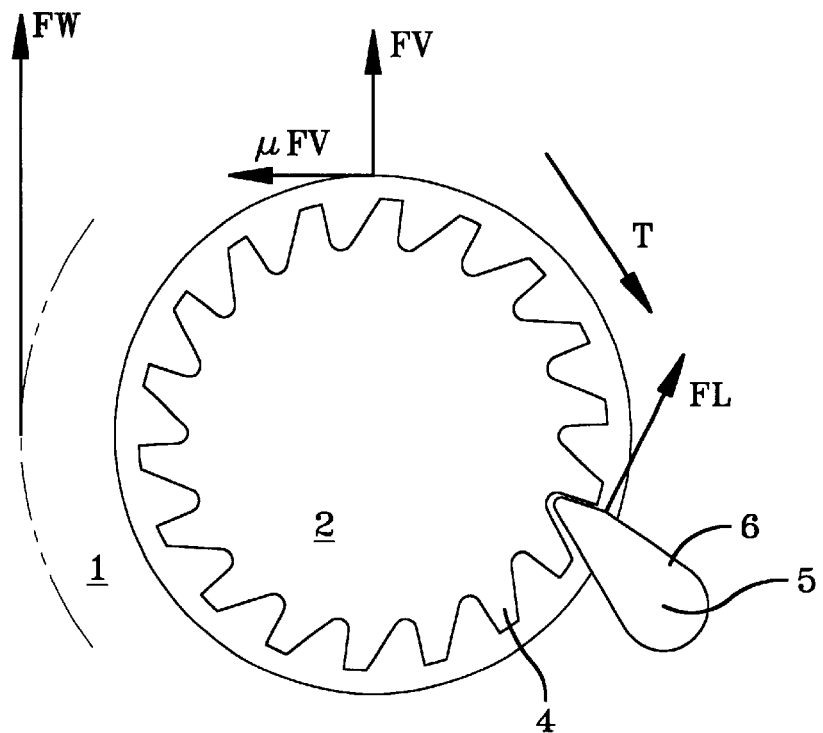
FIG. 2 is a cross-sectional side view of the seat belt retractor of FIG. 1 showing the primary locking pawl engaged under relatively low loads.
Figure 3:
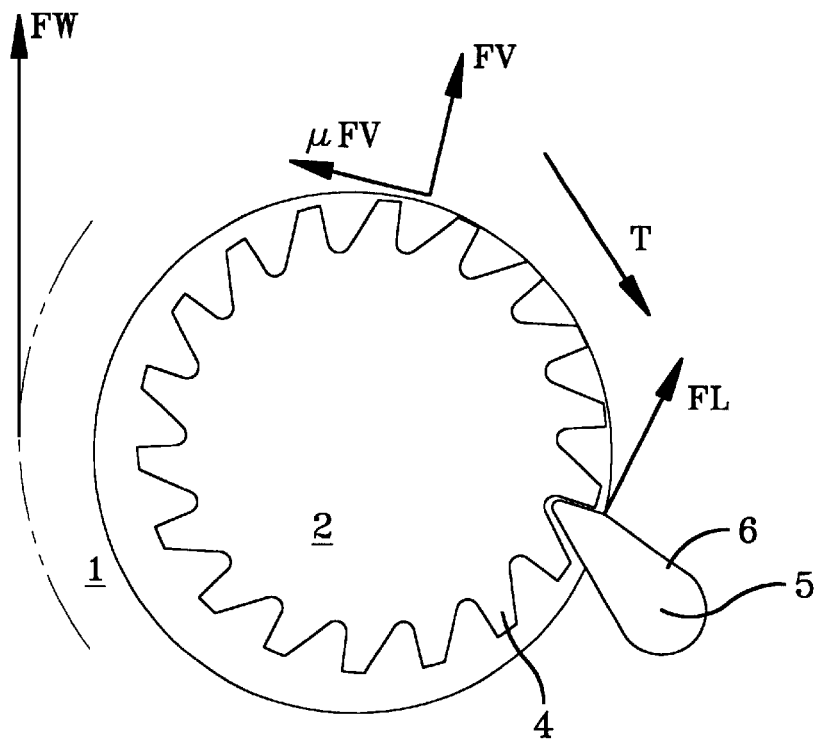
FIG. 3 is a cross-sectional side view of the seat belt retractor of FIG. 1 showing the primary locking pawl engaged under relatively high loads.

FIG. 1 shows the seat belt retractor in perspective and FIGS. 2 and 3 are cross-sectional side views.

In FIG. 2 the spool 2 is shown in its normal operative position relative to the frame 1. The locking pawl 6 has engaged the teeth on the ratchet wheel 4 thus preventing rotation of the spool 2.

The torque T exerted on the spool 2 from the forward momentum of the restrained vehicle occupant is counteracted by the force FV on the lockbar in stopping spool rotation. As the force, specifically that exerted by the webbing, increases the spool 2 rotates about the pivot point 5 and moves into contact with the frame as shown in FIG. 3. The resulting resisting force is shown as FV. By increasing the coefficient of friction between the contacting surfaces, the resisting force FV is increased thus taking some of the load of the locking pawl.

It will be seen that the resisting force FV is a relatively small force and could not alone hold the spool against rotation: the pawl 6 is necessary to lock the seat belt retractor.

The serrations 7 reduce the effective surface contact area between the inner periphery of the frame cutout and the spool bearing face. This concentrates the vertical loading over a smaller area of the spool causing the spool to yield locally and thus increasing the coefficient of friction of the bearing face.

It will be noted that any part of the bearing face may engage the frame to equal effect. It is entirely random and not repeatable.

Many changes and modifications in the above described embodiments of the invention can, of course, be carried out without departing from the scope thereof. Accordingly, that scope is intended to be limited only by the scope of the appended claims.

We claim:

1. A seat belt retractor comprising a rotatable spool mounted in a frame, a primary locking mechanism for arresting rotation of the spool and a load absorbing mechanism arranged to come into effect at a predetermined load for absorbing a portion of a spool locking load, wherein the load absorbing mechanism comprises a section of an inwardly facing peripheral edge of the frame having a serrated or roughened texture and which is positioned and adapted so that above a predetermined load said serrated or roughened texture section engages with a smooth surfaced spool bearing face to absorb some of the load.

2. The seat belt retractor according to claim 1 wherein the primary locking mechanism comprises a locking pawl for engaging with ratchet teeth on the outer periphery of the spool.

3. The seat belt retractor according to claim 2 wherein the load absorbing mechanism comprises a section of an inwardly facing peripheral edge of the frame having a serrated or roughened texture and which is positioned and adapted so that above a predetermined load it co-operates with a smooth surfaced spool bearing face to absorb some of the load.

4. The seat belt retractor according to claim 3 wherein spool rotation is prevented on engagement of the primary locking mechanism and the load on the primary mechanism rises causing the frame side walls to deform and the serrated or roughened section is pushed closer to, and eventually against the spool bearing face, roughening the smooth surface and increasing coefficient of friction of the bearing face to absorb some of the load and resist rotation of the spool.

5. The seat belt retractor according to claim 4 wherein the roughened or serrated section is arranged diametrically opposite the pivot point of the primary locking pawl.

6. The seat belt retractor according to claim 3 wherein the roughened or serrated section is arranged diametrically opposite the pivot point of the primary locking pawl.

7. The seat belt retractor according to claim 3 wherein the serrated or roughened section of the frame comprises a stronger material than the spool.

8. The seat belt retractor according to claim 3 wherein the serrations are in the form of rough irregularly shaped small teeth placed at irregular or random intervals.

9. The seat belt retractor according to claim 3 wherein the serrations are in the form of grooves in the peripheral surface.

* * * * *